United States Patent [19]

Mallory

[11] Patent Number: 4,810,389
[45] Date of Patent: Mar. 7, 1989

[54] FILTRATION SYSTEM

[75] Inventor: Charles W. Mallory, Severna Park, Md.

[73] Assignee: Westinghouse Electric Corp., Pittsburgh, Pa.

[21] Appl. No.: 20,828

[22] Filed: Mar. 2, 1987

[51] Int. Cl.$^4$ .................. B01D 13/00; B01D 13/01; B01D 36/04; B01D 37/04

[52] U.S. Cl. .................. 210/650; 210/651; 210/774; 210/779; 210/195.2; 210/257.2; 210/321.87; 210/500.23; 210/258

[58] Field of Search ............. 210/636, 650, 651, 744, 210/779, 804, 195.2, 257.2, 258, 295, 416.1, 433.2, 500.23, 321.87, 739; 55/16, 158

[56] References Cited

U.S. PATENT DOCUMENTS

| | | | |
|---|---|---|---|
| 3,852,388 | 12/1974 | Kimura | 55/16 |
| 4,002,567 | 1/1977 | Konno et al. | 210/433.2 |
| 4,060,488 | 11/1977 | Hoover et al. | 210/433.2 |
| 4,140,806 | 2/1979 | Glimenius et al. | 210/651 |
| 4,147,621 | 4/1979 | Giddings | 210/637 |
| 4,165,288 | 8/1979 | Teed et al. | 210/433.2 |
| 4,200,533 | 4/1980 | Gaddis et al. | 210/195.2 |
| 4,276,176 | 6/1981 | Shorr | 210/651 |
| 4,276,177 | 6/1981 | Smith | 210/650 |
| 4,411,781 | 10/1983 | Schnable et al. | 210/195.2 |
| 4,416,772 | 11/1983 | Sato et al. | 210/195.2 |

FOREIGN PATENT DOCUMENTS 150405 9/1982 Japan .................. 210/650

OTHER PUBLICATIONS

Goldsmith et al., "Soluble Oil Waste Treatment Using Ultrafiltration", 32 pages, report for the 46th Annual Conference of the Water Pollution Control Federation, Oct. 4, 1973.

Primary Examiner—Richard V. Fisher
Assistant Examiner—Linda S. Evans
Attorney, Agent, or Firm—Joel R. Petron

[57] ABSTRACT

A method and apparatus are disclosed for increasing the concentratin of suspended particles within a slurry by removal of the fluid. The slurry is passed along the surface of a porous material such as porous plastic pipe having pores of a diameter greater than that of the suspended particles. The slurry flows at a velocity parallel to the surface of the porous plastic pipe that is much greater than the lateral velocity of the fluid through the pores in the pipe. The suspended solids with diameters smaller than the diameter of the pore opening are retained and concentrated within the flowing slurry because of the high flow velocity tangential to the pores.

12 Claims, 2 Drawing Sheets

FILTRATION SYSTEM

BACKGROUND OF THE INVENTION

1. Field of the Invention

This invention is a system for concentrating suspended solid particles in a fluid by removing essentially pure fluid from the fluid/solid particle slurry.

Filtration is one of a class of mechanical separations which involve the physical removal of a component as a separate phase, such as the separation of a solid from a liquid. Additional mechanical separations are centrifugation, sedimentation, screening and floatation. The other category of separation depends on the tendency of a soluble component to concentrate in one phase or another. Examples of this class of separation are distillation, gas absorption and liquid-liquid extraction.

For filtration, in general, a slurry is forced against a filter medium which is a thin barrier made of natural, synthetic or metallic fibers. The pores of the medium, or septum, are small enough to prevent the passage of nearly all of the solid particles; others impinge on the fibers, consequently a cake builds up on the filter and after the initial deposition the cake itself serves as the barrier. The capacity of the device is governed by the rate of flow of the fluid filtrate through the ever thickening bed formed by the solid particles.

One type of filtration uses membranes to trap the particles. Membrane filtration is usually considered to be divided into two different processes: the filtration of micro-solutes (particles less than 10 angstroms), called reverse osmosis, and the filtration of macro-solutes and suspended particles of a size larger than 10 angstroms, called ultra-filtration.

Ultra-filtration has an advantage over other filtration systems in that ultra-filters do not directly trap excluded particles: hence, the filtration member does not rapidly lose permeability. Ultra-filtration is a process in which a pressurized solution is caused to flow across a membrane surface. The membrane is designed so that water and species smaller in size than the rejected dimensions of the membrane will pass through the membrane, while larger species will be rejected at the membrane surface and pass downstream to be eliminated in a rejection flow.

A problem encountered in the ultra-filtration of large volumes of water is the build-up of rejected species which do not traverse the membrane. Such rejected species, though not trapped within the membrane, accumulate upon the ultra-filtration membrane surface. This phenomenon is called concentration polarization.

Within an ultra-filtration system there is an impressed pressure differential across the membrane. Water and other very small molecules pass through the ultra-filtration membrane. Solutes larger than the rejection size of the membrane travel to the membrane surface but do not traverse the membrane. At the ultra-filtration surface such species accumulate. These species are removed from the surface only by back diffusion into the bulk flow. Since the water flux of ultra-filtration membranes is high, the convective transport rate is initially much higher than the diffusive back transport rate. A concentration of solute, therefore, builds up at the membrane surface until the solutes precipitate and form a gel. The thickness of this gel layer will increase until its hydraulic resistance to water transport reduces the water flux to an equilibrium value. At equilibrium the convection transport equals the diffusive transport and ultra-filtration is inhibited. Once concentration polarization is in control increasing the pressure of the stream will not increase the flux since the higher pressure will cause a thicker layer of gel and hence greater resistance.

Ultra-filtration purification systems present some additional design problems. If the ultra-filtration membranes are allowed to dry out, they irreversibly consolidate and lose their permeability. Thus, they must be maintained in a wet state at all times. Ultra-filtration membranes are also extremely thin, and large membrane areas must be maintained for any commercial scale operation. The probability, therefore, of a leak developing somewhere in a large commercial system is significant.

Another distinct characteristic of conventional ultra-filtration systems is that the transfer through the membrane filter is improved when a turbulent flow is ensured. Turbulent solution transport that passes normally as well as transversely to the flow direction carries the solution vigorously to the membrane on one hand and also ensures removal of retained components on the other hand. Retained components will inhibit the permeation of the membrane either due to concentration build-up or deposits on the membrane.

For example, most radioactive, toxic and hazardous waste streams contain both suspended solids and dissolved solids. Generally the liquid contains very small amounts of the suspended solids. In order to treat the liquid to remove the dissolved solids, however, it is necessary to first remove the particulates. The filtration equipment currently used for this purpose consists of cartridge filters, belt-type filters, pre-coat filters or granular filters. In all cases the removed solids and the filters will be contaminated and must be specially handled to prevent the spread of contamination. Also, depending on the amount of material to be treated, more than one filter may be needed.

A device and method is therefore desired that would allow the removal of fluid from a fluid/solid particle slurry without the disadvantages of filters in general and ultra-filtration systems in particular. For any filtering system the underlying problem is the removal of accumulated solids on the filter surface that impede the flow of fluid therethrough and require that operation of the filtration system be halted to clean, remove or backflush the filters.

It is therefore an object of the present invention to describe a filtration system and method that overcomes the above disadvantages of conventional filtration and ultra-filtration systems.

2. Description of the Prior Art

Schnabel et al. U.S. Pat. No. 4,411,781 describes an apparatus for ultra-filtration at pressures up to 100 bars by using suitably pressure tight diaphragms, that is membranes, as well as by modifying the normal ultra-filtration installations. The apparatus utilizes a pressure stable capillary diaphragm as the main filtration element and means for holding the diaphragm in the module. The filtration element is of a structure wherein the capillary diaphragms are permeated from the outside toward the inside as the crude solution flows in an axial direction therealong under a flow pressure gradient. The preferred diaphragms are porous glass capillaries with an external diameter of 200 to 500 micrometers with a pore size in the range of 11 to 1000 Angstroms. This reference states specifically that care must be taken to ensure the inlet flow of the crude solution into the module is not directed transversely at the capilliaries.

Hoover et al. U.S. Pat. No. 4,060,488 describes an ultra-filtration device which includes a porous support having one surface coated with a membrane that comprises at least two sizes of particles, one size capable of passing through the pores and another size capable of passing into but not through the pores. This device is said to provide an improved ultra-filtration membrane which not only provides good performance as an ultra-filtration membrane but can be regenerated or replaced while the device is installed and resists deterioration by corrosive feed stocks. The porous support has pores from about 0.5 to 45 microns in their smallest cross-sectional dimension and a particulate membrane coated onto at least a portion of the surface of the support having large inorganic particles from about 0.5 to 45 microns in average cross-sectional dimension: particles that will enter but not pass through the pores of the support and other small inorganic particles from about 0.002 to 0.5 microns in average cross-sectional dimension and of a size that will pass through the pores of the support.

Shorr U.S. Pat. No. 4,276,176 describes an apparatus for low pressure, high flux water purification. The ultra-filtration unit has at least one porous filter tube lined with a skinned ultra-filtration membrane. This particular apparatus preferably operates on impurities that are heavy metal ions and other contaminates present in waste water derived from metal finishing and plating operations. It is staeed that the fluid flow adjacent to the membrane is preferably turbulent with the pressure between 9 and 150 psig. The ultra-filtration membrane comprises a layer of open porous sponge and an extremely thin porous skin having fine pores preferably of a size approximately 10 angstroms in diameter. It is stated that in the ideal system as the particle/water blend passes the tube under pressure the water is forced through the ultra-filtration membrane and porous tube walls. However, all particles larger than about 10 angstroms cannot pass through the pores and are carried axially along by the flow of the particle water blend in the tube.

The above references all contain conventional filter means in that the pores in the filter are of a diameter smaller than the particles that are to be excluded from passage.

SUMMARY OF THE INVENTION

In its most general form the present invention provides a method and apparatus for concentrating solid particles that are suspended in a fluid thus forming a slurry by removing a portion of the liquid from the slurry. The slurry is passed along the surface of a porous material that has pores with a diameter greater than the diameter of the particles that are being concentrated. The slurry moves along the surface of the porous material substantially parallel to the surface at a predetermined velocity to obtain substantially particle-free fluid through the porous material and obtain a higher particle concentration, fluid reduced slurry. The filtration unit takes advantage of the fact that the suspended solids and liquids are flowing at a relatively high velocity perpendicular to the openings (i.e., pores) in the walls of the pipe. This causes the size of the opening to be effectively reduced in diameter allowing particles to be retained which are much smaller than the opening in the pipe. The particles do have a certain lateral velocity as they pass over the pore openings in the pipe wall. If, however, the amount of lateral movement is less than half the diameter of the particle, it is likely that the particle will be retained. In contrast with other ultra-filtration techniques, particles entering the pores are much smaller than the pore diameter itself and pass through the opening with little or no danger of plugging. Replacement, cleaning or backflushing of the porous material surfaces will, therefore, not be required. It is pointed out, however, that this system is generally not acceptable as a single pass system and requires multiple recirculation. Processes requiring a high degree of filtration may need additional treatment because some particles do pass through the pores on a statistical basis and extreme purity may not be obtained at first pass.

DESCRIPTION OF THE PREFERRED EMBODIMENT

Figure 1:
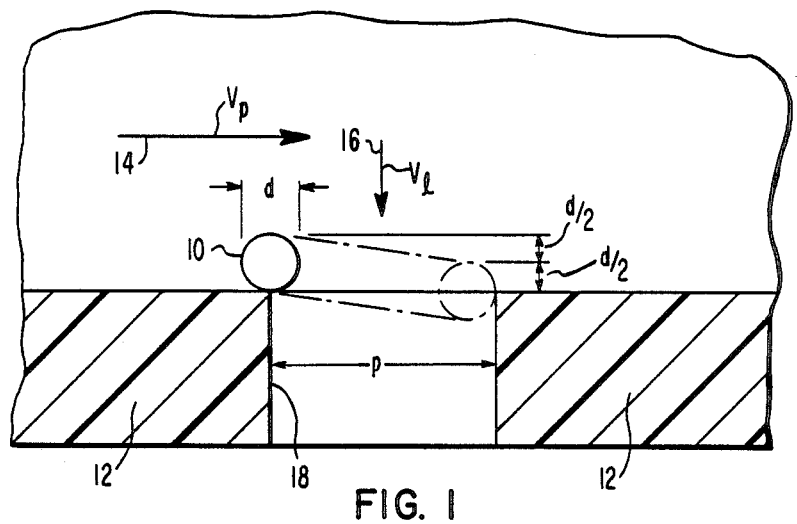
FIG. 1 is a schematic representation showing the principle of operation of the subject invention.

The principle underlying the operation of the present invention is shown in FIG. 1. Particle 10 which is carried along in the slurry by the fluid has diameter d. The fluid flow along the surface of the porous material 12 is at a high velocity and particle 10 travels at the same velocity here designated as $V_p$ and shown as vector 14. The particle also has a lateral velocity $V_1$ shown as vector 16. Filtration is based on the suspended solids and liquid flowing at relatively high velocities perpendicular to the opening 18 with diameter p in the walls 12 of the porous material. This causes the opening to be effectively reduced in diameter and allows particles to be retained which are much smaller than the pore 18 in the porous material. The effective velocity of the liquid through the pores in the porous material, $V_1$, will be much less than the velocity along the surface of the porous material. Particle having diameter d will move laterally as it passes over a pore opening having diameter p. If the distance that a particle moves into a pore 18 is less than half the diameter d of the particle it is likely that the particle will not pass through the pore 18. The size of particles that will be retained can be expressed as:

$$\frac{p}{d/2}$$

which is equal to $$\frac{V_p}{V_1}.$$

The method of using the flow velocity along the surface of a porous material to effectively reduce the size of the opening in the walls of the pore surface offers another distinct advantage. Those particles that do enter the pores will be much smaller than the pore diameter and will pass through the opening with little or no danger of plugging or clogging.

As a practical example porous plastic pipe made from polyethylene or polypropylene can be obtained with diameters ranging from ⅛ to 2 inches. The size of the pores in this plastic pipe is controlled and can be specified at any value between 5 and 60 microns. At a pressure of 15 psig porous pipe with ½ inside diameter will pass through the length of the pipe about ⅓ gallon of water per minute per foot of pipe. A reasonable velocity of a fluid being pumped through such a pipe designated previously as $V_p$ will be about 10 to 15 feet per second. The effective lateral velocity through the walls of the porous pipe designated previously as $V_1$ is expected to be at least 20 to 30 times less than the velocity along the pipe.

By using the above equation:

$$\frac{V_p}{V_1} = \frac{p}{d/2}$$

equal to 20 to 30, would yield $$d = \frac{p}{10} \text{ to } \frac{p}{15}.$$

Porous pipe having 30 micron pores can be expected to retain all particles greater than 2 to 3 microns in size. Porous pipe with smaller pores would have even greater retention because the lateral velocity would be lower and the pore size smaller.

Figure 2:
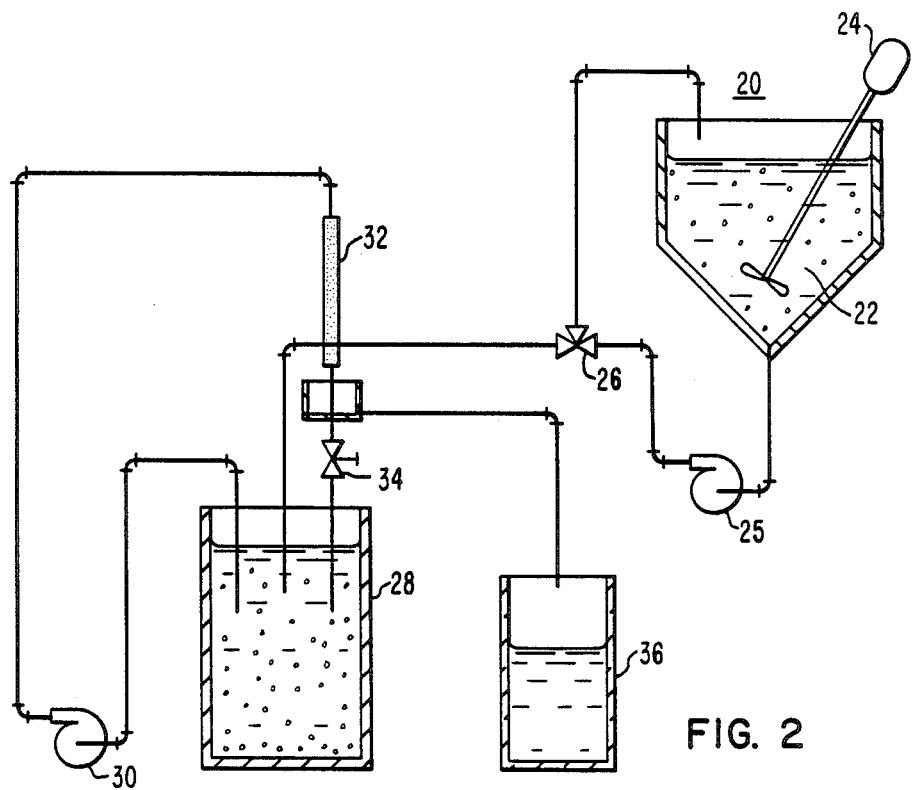
FIG. 2 is a schematic representation of the test set-up used in the reduction to practice of the invention.

FIG. 2 shows a test set-up that was used to reduce to practice the concept described above. The porous material used to concentrate the solid particles by removing essentially pure fluid was porous plastic pipe. Porous plastic pipe is a relatively new development that is used for filtration of materials in the manufacture of pharmaceuticals and for dewatering of resin and other fibrous and granular materials. In the above applications the flow is primarily through the walls of the pipe. As stated previously in this application the flow is principally in the pipe and the flow of essentially particle-free water through the pipe walls is small by comparison.

The waste type tested was a powdered ion exchange resin which consisted of particles ranging from 10 to 100 microns in diameter. The resin was totally depleted and contained an unknown quantity of iron oxide. The porous pipe was a polyethylene material having an average pore size of 30 microns. The test procedure consisted of the following steps:

Approximately 500 gallons of water was placed in tank 20. Fifty pounds of powdered ion exchange resin (diameter 10 to 100 microns) was added to tank 20 to create slurry 22. Mixer 24 was rotated to keep the solids in suspension. The slurry 22 in tank 20 was recirculated by means of pump 25 and by using a three-way valve 26. Level control probes (not shown) direct flow into a 55 gallon drum 28 or tank 20 to maintain a constant level in the drum 28. The slurry in the drum 28 was pumped by pump 30 through a porous pipe filter 32 at a rate of 6 to 10 gallons per minute. The throttle valve 34 was adjusted to attain a filtrate flow along the interior of porous pipe filter 32 of about one gallon per minute. Periodically the filtrate flow was checked and the throttle valve 34 adjusted to attain at least one gallon per minute flow.

Filtrate was collected in a graduate cylinder 36 and visually examined for solids. If solids were found, the graduate cylinder was to be shaken and the zone settling rate measured using a ruler and stop watch. The test set-up was operated for six hours and the filtrate flow rate and clarity recorded.

The results of this test are given in Table 1.

TABLE 1

Test Results
50 lbs resin (10–100 μm dia) in 500 gallons of water along 36 in. of plastic pipe - 30 μm pores

| Time (Min) | Filtrate Flow Rate (gpm) | Pressure (psi) | Slurry Flow Rate (gpm) | Filtrate Clarity |
|---|---|---|---|---|
| 0 | 0.53[1] | 1.2 | 7.5 | Clear |
| 18 | 1.15[2] | 5.0 | 7.0 | Clear |
| 70 | 0.75 | 10 | 7.0 | Clear |
| 225 | 0.60 | ~30[3] | 6.0 | Clear |
| 310 | 0.50 | ~30 | 5.0 | Clear |
| 360 | 0.50 | ~30 | 6.0 | Clear |

[1]Throttling valve open.
[2]Throttling valve adjusted to obtain greater flow rate.
[3]Vacuum gauge appeared stuck once reaching 30 psi. After this point, the throttling valve was not closed further for fear of rupturing the porous tubing.

Reference to the table shows that throughout the test the filtrate remained clear. The solids remained in the slurry and did not pass through the porous tubing with the filtrate liquid. The filtrate flow rate, however, can be seen to have begun to decrease due most likely to gradual plugging of the porous tubing by particles having a diameter greater than the 30 micron diameter of the pores in the plastic pipe. The decline was steep initially but then leveled out at approximately ½ gallon per minute.

The consistent filtrate clarity throughout the test supports the basic concept of the invention and shows a viable pproach to separating a fluid from a slurry containing suspended particles.

Figure 3:
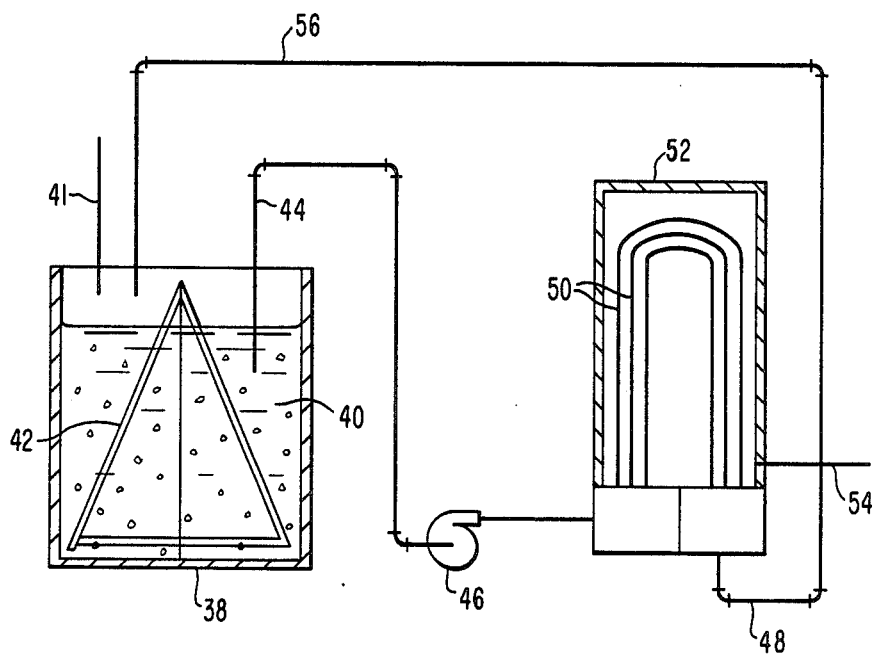
FIG. 3 is a schematic representation of an apparatus for commercial application of the present invention.

Referring to FIG. 3, a system for the processing of slurries on a commercial scale is shown. As illustration, a disposable container 38, six feet in diameter and six feet high is shown. Slurry 40 is held in container 38 to a depth of 54 inches representing 127 cubic feet or 952 gallons of slurry. The slurry 40 is supplied to container 38 by feed line 41 filling the container with the slurry to a predetermined level.

Particles having a first diameter and with a typical density of 2.65, such as silt or sand, would produce an ultimate 50 weight percent slurry with a specific gravity of 1.726, and would weigh 14.4 pounds per gallon. With container 38 holding slurry to the 54 inch level, the weight of the contents would be 13,710 pounds of which half, or 6,855 pounds, would be solids. The suspended solids and contaminated liquid generally will range from 100 to 10,000 ppm.

Table 2 shows the quantity of liquid that can be processed using the 6,855 pounds of solid capacity in the disposal tank.

TABLE 2

Maximum Possible Quantities of Liquid Processed

| Solids Concentration (ppm) | Solids Weight (lbs per gal) | Quantity Processed (gal) |
|---|---|---|
| 100 | 0.000834 | 8,219,400 |
| 1,000 | 0.00834 | 821,940 |
| 10,000 | 0.0834 | 82,194 |

Tank 38 is designed to take advantage of settling within the tank to reduce the solid concentration of liquid being pumped through the filter unit. Settling baffles 42 permit particles that settle by gravity to remain relatively undisturbed while the remaining slurry is being processed. Slurry is pumped out of container 38 through a discharge line 44 by means of pump 46 having a suction on discharge line 44.

The slurry is passed through filtration unit 48 along and substantially parallel to a surface of a porous material such as from one end of a plurality of parallel porous plastic pipes 50 along a surface of the pipes, in this case the interior surface. Pump 46 serves as the means for passing the slurry along the porous material, pipes 50. The pores of the plastic pipe 50 have a diameter greater than the diameter of the suspended solids within the slurry 40. In this embodiment the filtration unit has a capacity of 50 gallons per minute output based on the porous pipe with an inside diameter of ½ inch and flow through the walls of ⅓ gallon per minute per foot, 150 feet of porous pipe is required, 25 U-shaped tubes with 6 feet of porous pipe per tube will provide the required surface area. The inlet area of the 25 tubes is 0.034 square feet.

At a velocity of 15 feet per second the inlet flow to the filter is 0.51 cfs or 229 gpm. Since 50 gpm of filtered water will pass through the walls of the pipe the velocity of the water at the outlet of the unit will be the difference 179 gpm or, 0.40 cfs.

The velocity of the flow can be calculated therefrom as 11.7 feet per second. This flow velocity is adequate to provide high retention of fine grained particles near the outlet of the filter. The pressure drop through the filter will be highest when the solids in the disposable tank build up to the highest concentration. The pressure drop can be calculated as follows:

$$Hf = 0.15 \left(1 - \frac{P - 10}{100}\right) \frac{LV^2}{2GD}$$

where:
Hf=head loss in feet
P=weight percent solids, 50%
L=length in feet, 6+3=9 feet
V=velocity in ft/sec=(15+11.7):2=13.4 fps
G=32.2 ft/sec$^2$
D=diameter in feet, 0.5 in:12=0.042 feet $$Hf = 0.15 \left(1 - \frac{50 - 10}{100}\right) \frac{9 \times 179.6}{2 \times 32.2 \times 0.042}$$

$$= (0.6) \times 89.6 = 53.8 \text{ feet}$$

$$53.8 \times 62.4:144 = 23.3 \text{ psi}$$

Ht=Hf+backpressure=23.3+11.7=35 psi (80.8 feet)

The pumping power required will be approximately:

$$\text{Pumping Power} = \frac{F \times D \times S.G. \times Ht}{550 \times \text{Eff.}6}$$

where
F=flow in CFS (0.51+0.4)/2=0.455
D=density of water, 62.4 lbs/cf
S.G.=specific gravity of slurry, 1.73
Ht=total head in feet, 80.8 feet
550=conversion ft-lbs/sec to H.P.
Eff=efficiency, 0.8

Pumping Power =

$$\frac{0.455 \times 62.4 \times 1.73 \times 80.8}{550 \times 0.8} = 9 \text{ horsepower}$$

Relatively particle-free liquid is discharged to and then removed from a collection means such as collection tank 52 of filtration unit 48 through outlet means 54. The higher concentrate slurry that exits from the interior of porous plastic pipe 50 goes to slurry receiving means such as returning to container 38 by means of a higher concentration slurry return line 56. The high concentration slurry return line 56 and the discharge line 44 are located substantially opposite each other above settling baffle 42 near the top periphery of the container. Slurry is continually supplied through feedline 41 to maintain the predetermined level of slurry in container 38 during processing of the slurry.

The process is continued and slurry 40 within container 38 is continuously cycled through filter unit 48. The concentration of the suspended solids in the disposable tank 38 will continue to increase as water is processed through the filter unit. Generally, the concentration of solids in the slurry 40 contained in container 38 is measured, and processing discontinued at a predetermined concentration of solids, typically 50 percent. When the predetermined solid concentration is attained, the filtration system is removed and the concentrated liquid is solidified. The solidified slurry can then be shipped and buried in the disposable container 38.

Additional tests were made on a pilot scale unit utilizing porous plastic pipe which was fabricated from granular plastic material with the porosity produced by leaving voids between the plastic granules. The unit was to concentrate the backwash slurry from a fabric filter using the method of the invention described above.

In use, almost immediate plugging of the porous pipes occurred. It is believed that the pathway through the porous plastic pipe is too tortuous and material passing between the granular plastic particles clogged the pathway.

It is believed that this was not seen in earlier tests because the smallest particles used then were only about 10 microns.

It is now believed that in filtering material with larger particles, the preferred embodiment would utilize porous pipe with very thin slots rather than pipe having a tortuous path network. The slots would be tapered through the porous material in this embodiment to increase the pore openings from the surface along the slurry flow path to the liquid exit surface so that any particles passing the interior slot would not clog as it progresses through the pipe.

I claim:
1. A method of concentrating suspended solids of a known particle diameter contained in a slurry by removing a portion of the liquid from the slurry, said method comprising:
passing he slurry along and substantially parallel to a surface of a porous material, pores of said material having a known diameter at least ten times greater than the diameter of said solids, at a velocity about or greater than twice said pore diameter divided by said solids particle diameter times the velocity of the liquid through the porous material to obtain through the pores of said material substantially particle-free liquid and to obtain along said surface higher concentration, liquid reduced slurry.

2. The method of claim 1 wherein said pore diameter increases through said porous material from the surface along which said slurry passes to the liquid exit surface.

3. A method of concentrating suspended solids of a known particle diameter contained in a slurry by removing a portion of the liquid from the slurry, said method comprising:
   filling a container with the slurry to a predetermined level,
   pumping said slurry from said container to a filtration unit having porous pipe therein, pores of said pipe having a diameter at least ten times greater than said diameter of suspended solids,
   passing the slurry from one end of said porous pipe along a surface of said pipe within said filtration unit at a velocity about or greater than twice said pore diameter divided by said solids particle diameter times the velocity of the liquid through the porous material to obtain through said porous pipe wall substantially particle-free liquid and to obtain a higher concentration, liquid-reduced slurry discharge from the outer end of said porous pipe,
   returning the higher concentrate slurry discharge to said container, and
   removing the liquid from said filtration unit.

4. The method of claim 3 wherein said surface of said pipe is the interior surface.

5. The method of claim 4 wherein said passing of the slurry along the interior of said pipe is discontinued at a predetermined concentration of suspended solids in the liquid within said container.

6. The method of claim 3 wherein said filling of said container is continually performed to maintain said predetermined level in said container during the remainder of the process.

7. The method of claim 6 wherein said passing of the slurry along a surface of said pipe is discontinued at a predetermined concentration of suspended solids in the slurry within said container.

8. An apparatus for concentrating suspended solids of a known particle diameter contained in a slurry by removing a portion of the liquid from the slurry, said apparatus comprising:
   a porous material, pores of said material having a diameter at least ten times greater than said diameter of said solids,
   means for passing the slurry along and substantially parallel to a surface of said material at a velocity about or greater than twice said pore diameter divided by said solids particle diameter times the velocity of the liquid through the porous material,
   collection means for collecting substantially particle-free liquid obtained through the pores of said material, and
   slurry receiving means for accepting higher concentration liquid-reduced slurry from along said surface.

9. The apparatus of claim 8 wherein said pore diameter increases through said porous material from the surface along which said slurry passes to the liquid exit surface.

10. An apparatus for concentrating suspended solids of a known particle diameter in a slurry by removing a portion of the liquid from the slurry, said apparatus comprising:
   a container having a feed line for filling said container with slurry, a discharge line for removal of slurry from said container, and a higher-concentration slurry return line for returning liquid-reduced slurry to said container,
   a pump means having suction on the discharge line of said container,
   porous pipe, pores of said pipe having a diameter at least ten times greater than said diameter of suspended solids and one end of said pipe connected to receive along a pipe suface slurry discharged from said pump means, wherein said pump means incudes means for discharging the slurry at a velocity about or greater than twice said pore diameter divided by said solids particle diameter times the velocity of the liquid through the porous material, and the other end of said porous pipe arranged to deliver discharge from along a pipe surface to said higher-concentration slurry return line of said container, and
   a collection tank surrounding said porous pipe, and having outlet means for removing collected liquid.

11. The apparatus of claim 10 wherein said container comprises settling baffle means to interrupt turbulence within said container.

12. The apparatus of claim 11 wherein said higher-concentration slurry return line and said discharge line are located above said settling baffle means and said return line and said discharge line are located substantially opposite each other proximate the top periphery of said container.

* * * * *